United States Patent [19]

Unger et al.

[11] Patent Number: 4,808,116

[45] Date of Patent: Feb. 28, 1989

[54] TELEPHONE DISTRIBUTION FRAME CONNECTOR ASSEMBLY

[75] Inventors: John J. Unger, Elmhurst; Louis Suffi, Westchester, both of Ill.

[73] Assignee: Reliance Comm/Tec Corporation, Chicago, Ill.

[21] Appl. No.: 901,964

[22] Filed: Aug. 27, 1986

Related U.S. Application Data

[63] Continuation of Ser. No. 591,765, Mar. 21, 1984, abandoned.

[51] Int. Cl.$^4$ ............................................. H01R 4/66
[52] U.S. Cl. ..................................... 439/94; 439/719; 439/722
[58] Field of Search .......... 339/198 R, 198 H, 198 G, 339/198 GA, 198 J, 18 R, 18 B, 18 C, 18 P, 14 R, 14 P; 179/91 R, 98, 178, 179; 174/60; 361/119, 426, 428; 439/92, 94, 620, 719, 722, 723

[56] References Cited

U.S. PATENT DOCUMENTS

| | | | |
|---|---|---|---|
| 2,411,783 | 11/1946 | Gauthier | 339/198 H |
| 2,597,286 | 5/1952 | Burgess | 339/198 J |
| 3,904,936 | 9/1975 | Hamrick, Jr. et al. | 339/198 J |
| 3,936,133 | 2/1976 | Splitt et al. | 339/18 R |
| 3,955,868 | 5/1976 | Kindermann et al. | 179/98 |
| 3,961,227 | 6/1976 | DeLuca et al. | 339/14 R |
| 4,037,910 | 7/1977 | Paluch | 339/198 |
| 4,057,692 | 11/1977 | DeBortoli et al. | 179/98 |
| 4,099,821 | 7/1978 | Debaigt | 339/198 R |
| 4,176,257 | 11/1979 | DeLuca | 179/98 |
| 4,179,170 | 12/1979 | Splitt et al. | 339/65 |
| 4,331,839 | 5/1982 | Baumbach | 179/98 |

Primary Examiner—Eugene F. Desmond
Attorney, Agent, or Firm—Michael M. Rickin

[57] ABSTRACT

A telephone distribution frame connector assembly for connecting incoming lines to inside equipment and comprises a module field block, a test field block and an equipment field block, and a frame member for mounting the field blocks to a telephone distribution frame. The field blocks are mounted to the frame member to define a generally rectilinear enclosure having one open side. An access panel is provided for normally covering the one open side of the connector assembly, and a panel securing arrangement is provided for removably, securely engaging a marginal peripheral portion of the access panel with a peripheral edge portion of the open side. One or more of the field blocks includes a plurality of ground terminals located interiorly of the enclosure thus defined. A common ground bus is electrically coupled to all of the ground terminals and an adjustable ground selection arrangement is provided for alternatively coupling the ground bus to one of a frame ground and an isolated ground. The test field block and equipment field block are mounted in a side-by-side condition to form a front side or surface of the assembly. A securing arrangement is provided for securely holding the test field block and the equipment field block to the frame and to the module field block in this side-by-side alignment while readily permitting removal for repair or replacement of either thereof separately.

15 Claims, 4 Drawing Sheets

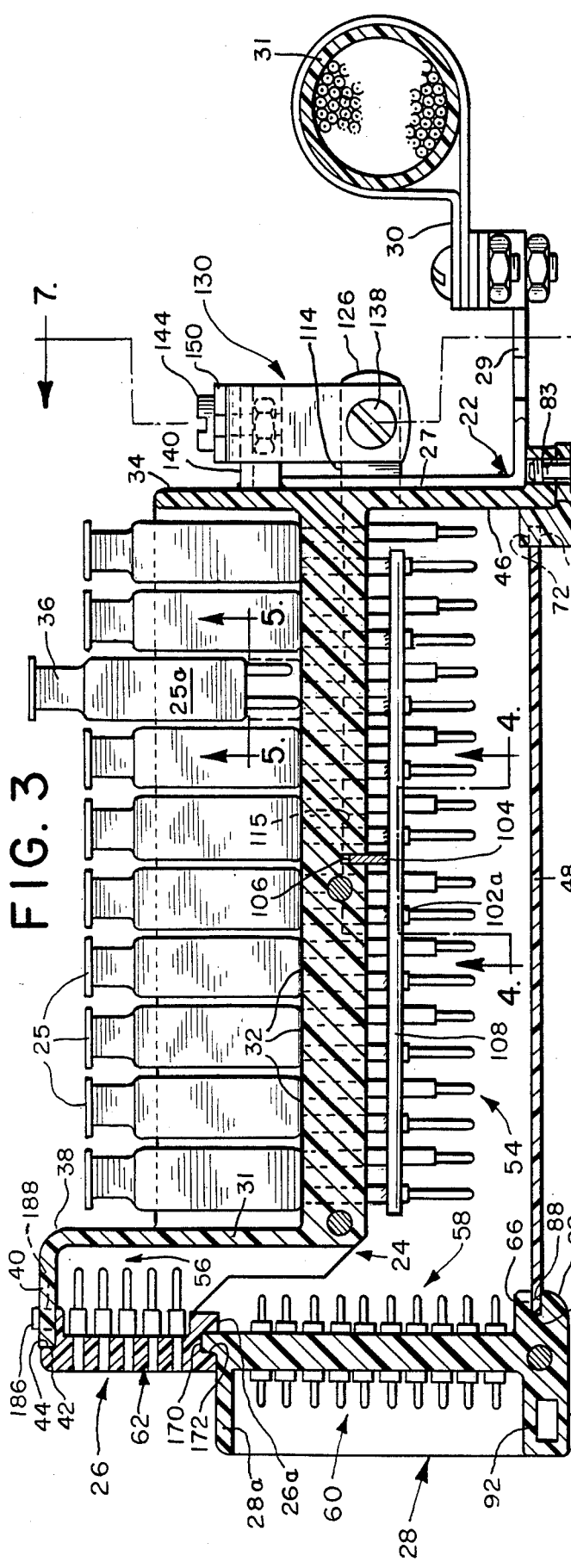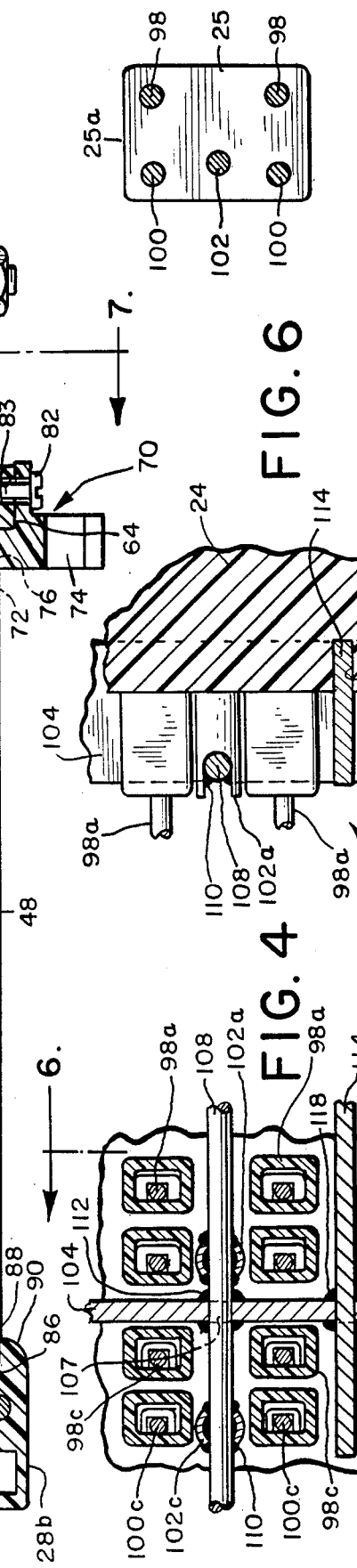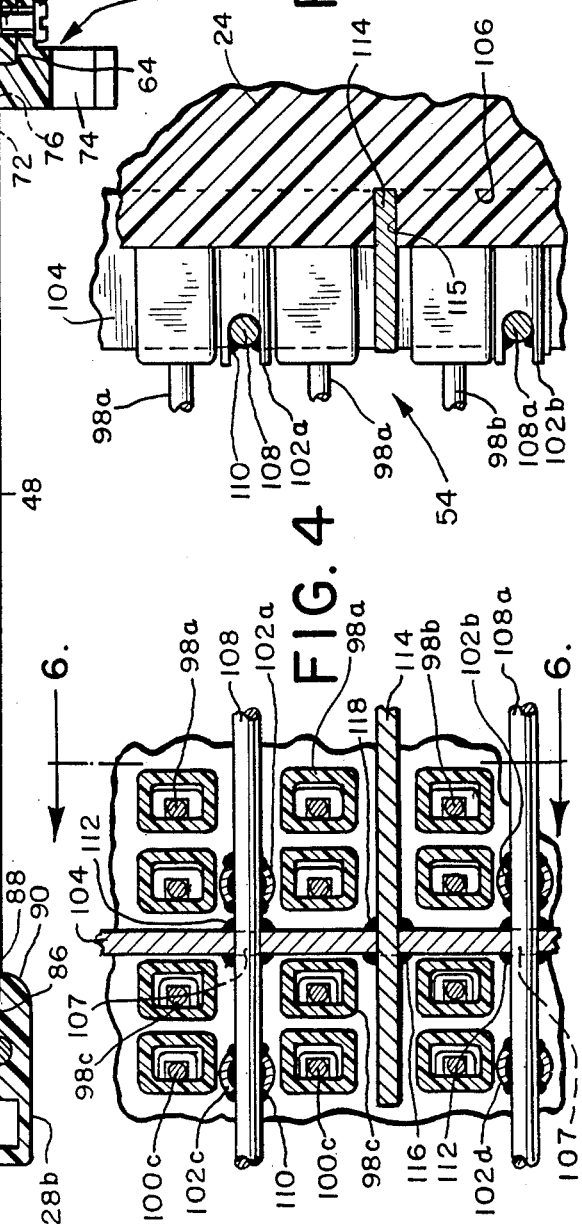

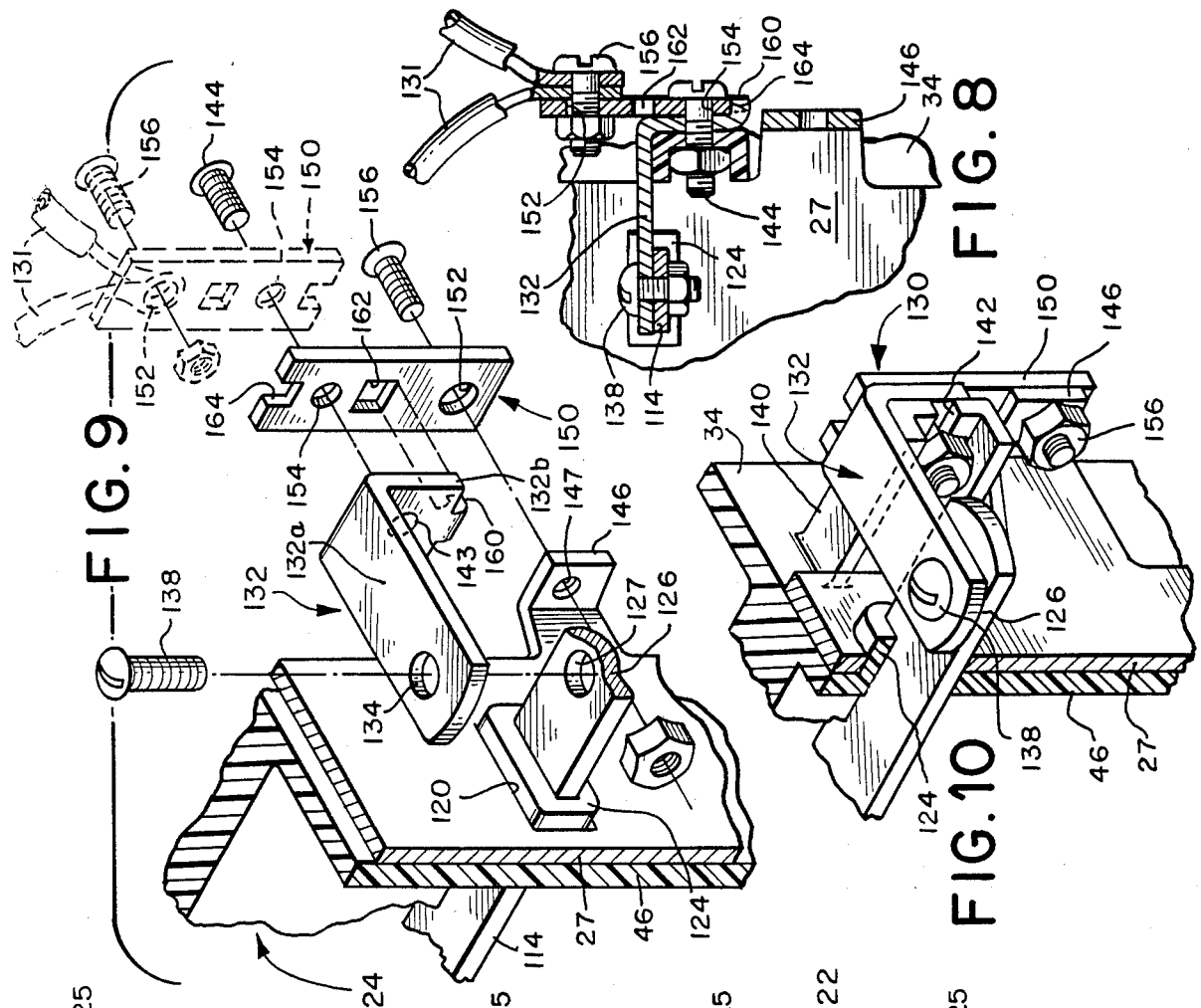
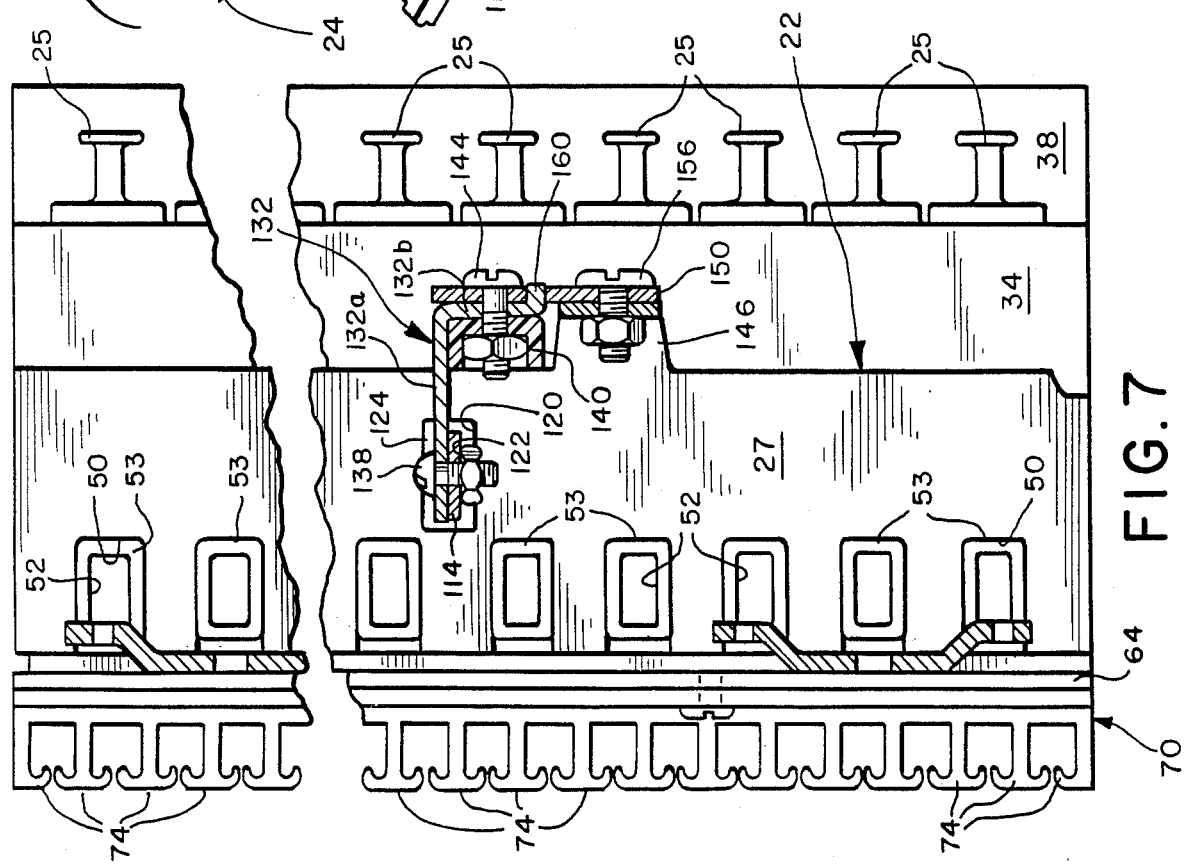

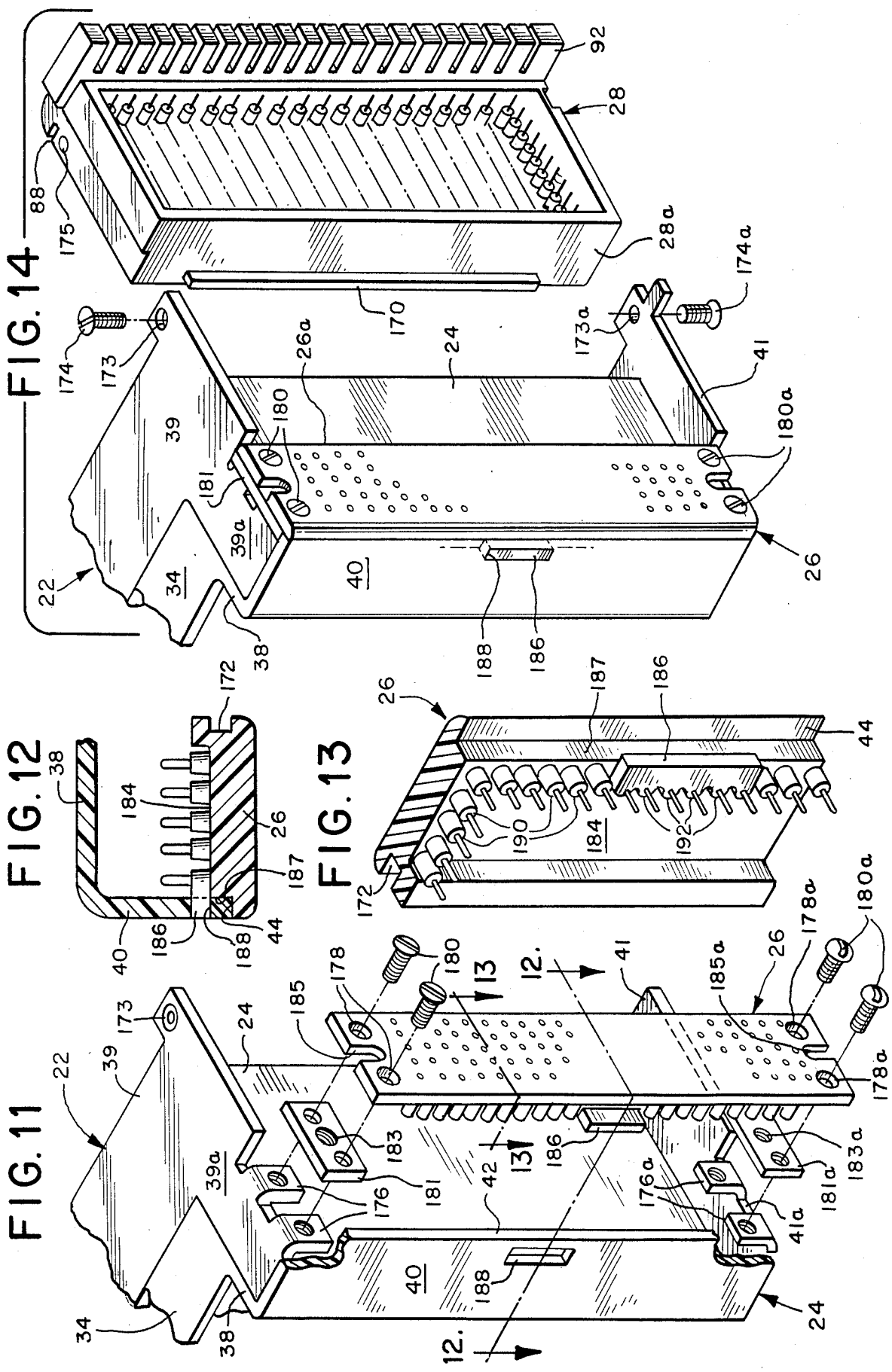

TELEPHONE DISTRIBUTION FRAME CONNECTOR ASSEMBLY

This is a continuation of application Ser. No. 591,765 filed on Mar. 21, 1984, now abandoned.

BACKGROUND OF THE INVENTION

This invention relates to telephone circuit distribution systems and more particularly to a telephone distribution frame connector assembly having overload protector modules that provide line protection for inside plant equipment such as central office switching equipment.

Telephone distribution frame connectors or panels as they are sometimes called, of the type having plug-in modules are generally known in the telephone art. In such connectors outside lines are connected to in-plant or central office switching equipment through protector modules which protect the inside equipment from damage due to over-voltage or over-current faults. These connectors or panels are mounted on distribution frames which are generally positioned close together. Space is often at a premium in such installations and accordingly, down-sizing or other space saving measures in the design of the connector assembly is a continuing objective.

A typical such connector assembly includes a module field which includes suitable connectors and terminals for receiving a plurality of overload protectors, a test field for receiving a test shoe to test the integrity of the connections, and an equipment field for terminating conductors from the inside plant equipment or central office switching equipment. The incoming lines are generally terminated either directly or through a cable stub to the terminals of the module field, which are respectively coupled to the appropriate terminals of receptacles which receive the respective overload protector modules. In this regard, a protector module is provided for each line pair being terminated in the module field. Accordingly, the protector modules are coupled between the incoming lines and the equipment field to provide a surge path to ground for the respective lines when an over-voltage fault or a current surge appears. In addition, the test field comprises a series of terminals coupled to the respective incoming lines. Thus, the connector assembly provides a protected interface between the incoming lines and inside plant lines and equipment, as well as providing a convenient place to test the various lines.

In typical arrangements of the foregoing types, wire conductors are routed between the various fields or groups of terminals in order to provide for the proper circuitry connections. These wire conductors may be wrapped or soldered or otherwise joined to the respective terminals, and they are generally routed behind the face of a module field "block" at which the modules are plugged in. Thus, these wire conductors are sometimes referred to as "back plane" wiring, that is, wiring which is internal to the connector assembly. In a typical connector assembly, a conductive metallic frame member is utilized to mount the module field, test field and equipment field in the desired relative orientations, and also to mount the connector assembly to the main distribution frame. In this regard, one or more field "blocks" are generally formed as by molding or another suitable process, from a suitable moldable non-conductive material, such as a plastic material. Generally speaking, this mounting of the connector assembly to the distribution frame and orientation of fields is preferably as to provide ready access firstly to the equipment field and test field and secondarily to the modules side of the module field. Accordingly, many connector assemblies orient or mount an equipment field block and/or test field block to form the front side of the connector assembly when mounted to the main distribution frame. The module side of the module field block is then mounted to one or the other side of the connector assembly, while a suitable access panel or cover plate is utilized to cover the back plane wiring thereon. The frame member and/or an additional wall portion of the module field block generally form a back or rear wall of the connector assembly. Accordingly, the connector assembly generally provides a housing or enclosure for enclosing the back plane wiring.

Many prior art connector assemblies provide a suitable ground path for ground points or terminals in the back plane, such as for the surge path for the overload protectors, directly to the metallic frame member which is in conductive contact with the distribution frame to provide what is generally called a "frame ground". However, in many installations it may be desirable to provide a current path to some ground point such as an "absolute" ground of a building or other installation, which is isolated or separate from the frame ground. Such an alternate ground is generally referred to as an "isolated ground". Many connector assemblies heretofore in use have included permanent internal electrical connection to the frame ground. Such assemblies have generally been incapable of field modification to achieve such an isolated ground connection. Moreover, such connector assemblies have often been incapable of such ground path modification even during the manufacturing process, without substantial changes to the internal construction thereof, at great expense and time and labor.

An additional problem has arisen with respect to the integrity of the access panel or back plane cover panel in connector assemblies heretofore in use. In this regard, typical connector assemblies accommodate as many as 100 line pairs and hence mount as many as 100 associated overload protector modules. Accordingly, while access is necessary to the back plane wiring from time to time, the cover should nonetheless provide a relatively flat, secure closure, to prevent the ingress of wire clippings, dirt or the like, when in service. Many connector assemblies heretofore in use have failed to provide a suitable cover and related assembly which may be reliably secured in this fashion and yet relatively simply removed for access to the back plane wiring.

A related problem has been the provision in some prior art assemblies of the test field block and equipment field block as a single integral piece to form the front surface of the connector assembly. In this regard, it is often desirable to provide equipment field blocks in a variety of configurations, for example utilizing insulation displacement type connectors as opposed to wire wrap type of connectors, or the like. While such modification is generally not done in the field, it is relatively common to provide blocks containing the differing types of terminals for different installations. Heretofore, this has been relatively expensive, requiring duplicate tooling and parts costs for the test field portion of the integral block, which is usually of the same configuration in all installations.

Accordingly, it has been proposed to utilize separate blocks for the test field and equipment field. However, the test field comprises numerous, relatively small terminal members and hence may present a relatively long, narrow surface. This block must also accommodate a removable, mating connector or "test shoe" to accomplish testing of the connections. Accordingly, we encountered problems in maintaining the test field block and equipment field block in substantially flat condition, and in side-by-side alignment at all times, especially upon repeated engagement and disengagement of the test shoe. In this regard, we also encountered some problems of bowing out of the test field block, especially toward a medial portion thereof.

OBJECTS AND SUMMARY OF THE INVENTION

Accordingly, it is a general object of this invention to provide a telephone distribution frame connector assembly for the general purposes previously stated while substantially avoiding the above-mentioned problems.

The further object is to provide a telephone distribution frame connector assembly which is capable of relatively simple and rapid modification, whether at the factory or in the field, to achieve either a frame ground or an isolated ground condition.

A further object is to provide a telephone distribution frame connector assembly which accommodates interchangeable equipment field blocks without disturbing or changing the test field block.

A related object is to provide a telephone distribution frame connector assembly in accordance with the foregoing objects which is relatively simple and inexpensive and yet highly reliable in operation.

In accordance with one aspect of the invention there is provided a telephone distribution frame connector assembly for connecting incoming lines to inside equipment and comprising means forming a module field a test field and an equipment field a frame member for mounting the fields to a telephone distribution frame and means for mounting the fields to the frame member to define a generally rectilinear enclosure having one open side. An access panel is provided for normally covering the one open side of the connector assembly, and panel securing means are provided for removably, securely engaging a marginal peripheral portion of the access panel with a peripheral edge portion of the open side.

In accordance with another aspect of the invention a telephone distribution frame connector assembly comprises means defining a module field, and a test field; an equipment field block, and a frame for mounting the fields to a telephone distribution frame. Means are provided for mounting the fields to the frame member to define a generally rectilinear enclosure. One or more of the fields includes a plurality of ground terminals located interiorly of the enclosure thus defined. A common ground bus means is electrically coupled to all of the ground terminals and adjustable ground selection means are provided for alternatively coupling the ground bus means to one of a frame ground and a selected other ground isolated from the frame ground.

In accordance with yet another aspect of the invention, a test field block, equipment field block and module field block are mounted to the frame member to define a generally rectilinear telephone distribution frame connector. The test field block and equipment field block are mounted in a side-by-side condition to form a front side or surface of the assembly. Additional securing means are provided for securely holding the test field block and equipment field block to the frame and to the module field block in a substantially coplanar, side-by-side alignment so as to permit selective removal for repair or replacement of either thereof separately.

BRIEF DESCRIPTION OF THE DRAWINGS

The foregoing, as well as other objects, features and advantages of the invention will be more readily appreciated upon reading the following detailed description of the illustrated embodiment, together with reference to the several figures of drawing, wherein:

FIG. 3 is a developmental view taken generally along the line 3—3 of FIG. 1;

FIG. 4 is an enlarged fragmentary developmental view taken generally along the line 4—4 of FIG. 3;

FIG. 5 is a bottom view of a single protector module, taken generally along the line 5—5 of FIG. 3;

FIG. 6 is a view taken generally along the line 6—6 of FIG. 4;

FIG. 7 is a rear view, partially in section, of the assembly of the invention, partially broken away, and taken generally along the line 7—7 of FIG. 3;

FIG. 8 is a fragmentary view illustrating a moved position of ground selecting elements of FIG. 7;

FIG. 9 is an exploded perspective view illustrating further features of the ground selecting elements of FIGS. 7 and 8 and the assembly of these elements;

FIG. 10 is a fragmentary perspective view of a portion of FIG. 7, illustrating further features of the ground selecting elements thereof;

FIG. 11 is an exploded perspective view of elements of the front of the assembly of FIG. 1, and illustrating further details thereof;

FIG. 12 is an enlarged sectional view taken generally along the line 12—12 of FIG. 11;

FIG. 13 is an enlarged partial sectional view taken generally along the lines 13—13 of FIG. 11, illustrating further details of one of the elements of FIG. 1; and FIG. 14 is a partially exploded perspective view of the front, left-hand portion of the assembly of FIG. 1.

DETAILED DESCRIPTION OF THE ILLUSTRATED EMBODIMENT

Figure 1:
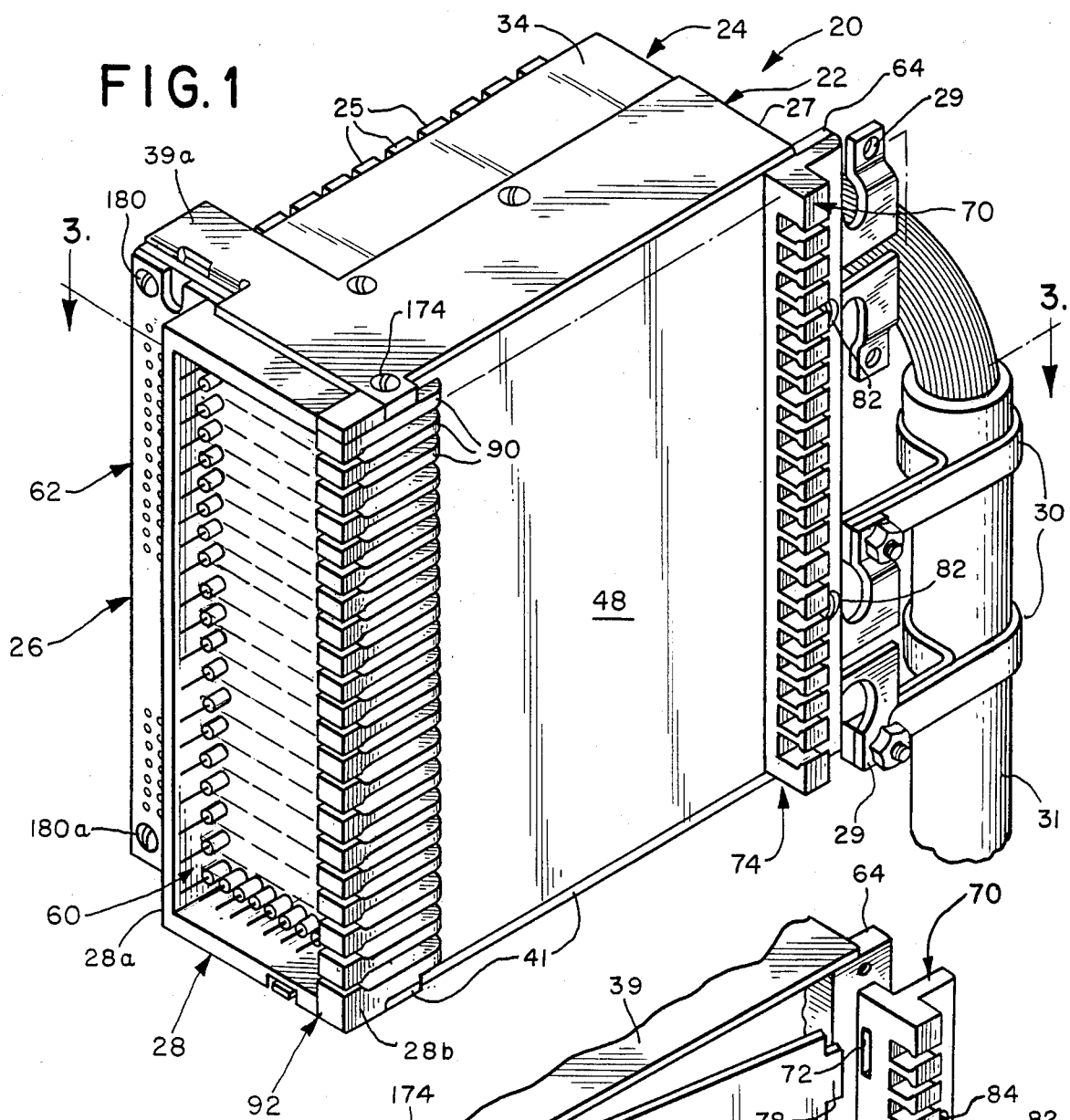
FIG. 1 is a front perspective view of a telephone distribution frame connector assembly in accordance with the invention in assembled condition.

Referring now to the drawings and initially to FIGS. 1 and FIG. 3, there is shown a connector assembly designated generally by the reference numeral 20. This assembly comprises a generally C-shaped frame member 22 which supports or mounts the remaining components of the assembly. In this regard, a module field block 24 mounts at an outer side thereof a plurality of over-voltage or surge protector modules 25. As will be seen later, each of these modules 25 receives an outside line and a corresponding line pair from inside telephone equipment or the like and provides a surge or discharge path to ground to protect the inside equipment from over-voltage or sudden current surges on the outside lines.

A test field block 26 and an equipment field block 28 are mounted in side-by-side condition to the frame member 22 and together define the front side of the assembly. A rear side of assembly is defined generally, by a rear wall portion 27 of the frame member 22. This wall 27 supports outwardly extending ears or tabs 29 which may be utilized to mount suitable clamps 30 for receiving an incoming cable or cable stub 31. Others of these ears or tabs 29 are used to mount the entire assembly 20 to a telephone distribution frame (not shown), which receives a plurality of similar connector assemblies to form a distribution system.

In this regard, and referring also to FIG. 3, it will be seen that the module field block 24 includes receptacles 32 to mount or receive the protector modules 25. The opposite or inner side is provided with a plurality of terminals 54 corresponding respectively to the terminals of the modules 25, and is generally referred to in the art as the "back plane". The module field block also defines an upstanding peripheral wall portion 34 which surrounds the modules 25 on four sides. The modules 25 may be removed and inserted with respect to receptacles 32 by grasping outer ends 36 thereof as illustrated for the module 25a. It will be noted that the front side of the raised peripheral wall 34 of the module field block 24 is provided with an integral extension 38 which flares outwardly at generally a right-angle to form a side wall portion 40, further defining a portion of the left-hand side of the assembly 20. This side wall 40 terminates at an edge 42. A corresponding outwardly projecting shoulder portion or edge 44 of the test field block 26 abuts and overlies this edge 42.

It will also be noted that the module field block 24 also includes an additional or rear wall portion 46 which generally forms an extension of the rear portion of upstanding wall portion 34 and thus forms a rear wall of the assembly 20. It will be seen that the assembly thus far described generally defines an enclosure, with test field block 26 and equipment field block 28 forming a front side thereof, and module field block 24 forming a left-hand and rear side thereof. The top and bottom of this enclosure are defined respectively by symmetrical upper and lower side portions 39, 41 of the C-shaped frame member 22. In this regard, the upper side portion 39 is best viewed in FIG. 1, it being understood that the lower side portion 41 is substantially a mirror image thereof. The last, otherwise open, right side is normally covered by an access panel 48.

As previously indicated, each of the field blocks 24, 26 and 28 includes a plurality of terminals or connector members on an outer surface for receiving conductors or mating connectors. In this regard, the modules 25 mate with the connectors carried in the receptacles 32 of module field block 24.

Outside lines enter from the cable or stub 31 by way of a plurality of through aligned openings 50, 52 defined respectively in the rear side of the frame member 22, as best seen in FIG. 7. In this regard, it will be noted that the rear portion 27 of the frame member 22 overlies a major portion of the rear wall 46 of the module field block 24. Preferably, the openings 52 include raised peripheral lip portions 53 to facilitate alignment of the module field block with the frame. This arrangement also holds wires running therethrough away from the metal frame, to avoid possible abrasion or damage to the wires by the edges of the openings 50 of the metal frame. While not clearly shown in FIG. 7 because of the nature of the view, the raised peripheral lip portions 53 are essentially identical in structure to raised peripheral lip portion 124 which is clearly shown in FIG. 9 and described hereinafter.

As previously mentioned, these outside lines are connected to in-plant or central office switching equipment through the protector modules 25, and these connections are accomplished at selected terminals of the back plane, as designated generally by reference numeral 54. In this regard, additional terminals for the back plane wiring are also defined on the interior sides of the test field block 26 and the equipment field block 28, these latter terminals being respectively designated by general reference numerals 56 and 58.

In operation, the wiring is then carried from others of the terminals 54 to the desired terminals 58 of the equipment field block 28, the connections thereof to inside equipment being completed at the outer face thereof which bears corresponding terminals indicated generally by reference numeral 60. The terminals 56 of the test field block 26 are generally coupled to those terminals 54 which receive the incoming lines, to permit a convenient place to test these various lines. In this regard, a suitable complementary test shoe not shown) may be interfitted over the exterior of the test field block 26 to accomplish such testing.

In accordance with one feature of the invention, the access panel 48 is provided with novel panel securing or hold-down means for removably, securely engaging a marginal peripheral portion thereof in a substantially flat condition against a peripheral edge portion of the otherwise open side defined by the enclosure or assembly 20. In this regard, this otherwise open side is generally defined by an outer edge portion 64 of the module field block wall 46, by an outer edge portion 66 of the equipment field block 28, and by edge portions of upper and lower walls 39, 41 of the C-shaped frame member 22.

Figure 2:
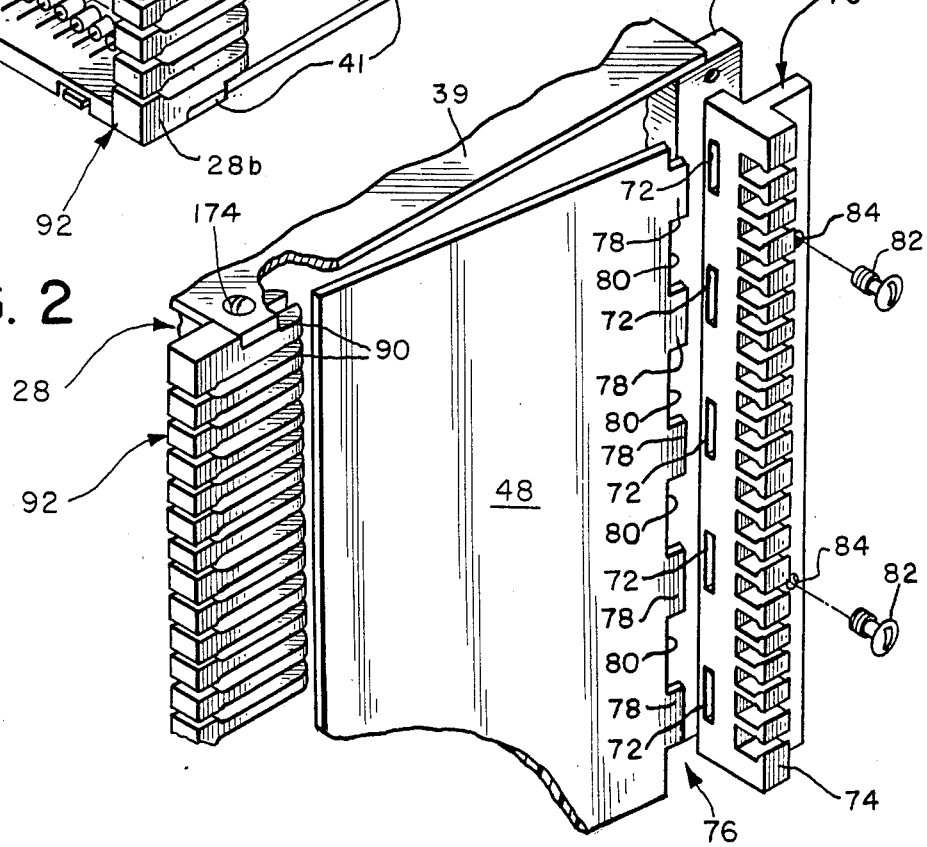
FIG. 2 is an exploded fragmentary view illustrating the assembly of a cover portion of the assembly of FIG. 1.

Referring also to FIG. 2, the access panel 48 comprises a relatively flat, generally rectilinear sheet or panel. The panel securing means comprises a first hold-down strip 70 which defines a first channel means in the form of a plurality of spaced-apart elongate slots 72 in a side surface thereof. It will be noted that the hold-down strip 70 also defines or includes molded therewith a rear fanning strip 74. This fanning strip 74 is provided for guiding or "fanning out" a plurality of conductors or wires from inside equipment about the rear, right-hand side of the assembly 20, en route to the equipment field 60. Cooperatively, this first "channel" receives a complementary portion of the facing edge 76 of the panel 48. In the illustrated embodiment edge 76 will be seen to comprise a series of projections 78 and recesses 80 which are of complementary configuration and location for interfitting with the slots 72 of the hold-down strip 70.

The hold-down strip 70 is in turn coupled with a flared out, facing edge surface 64 of the module field block by a pair of fasteners 82 which are assembled in captive relationship with apertures 84 therein and mate with complementary threaded openings 83 in the facing surface 64.

An opposite edge portion 86 of the access panel 48 is received in a second channel 88 defined at the opposite edge surface 66 of the enclosure, which comprises an end portion of the equipment field block 28. In the illustrated embodiment, this channel 88 is defined by the edge 66 which comprises an in-tuned shoulder portion of field block 28 and by a plurality of fingers 90 on the other side. These fingers 90, with reference to FIG. 1 will be seen to comprise rearward extensions of a plurality of generally T-shaped members 92 which form or define a front fanning strip of the connector assembly. This front fanning strip guides the conductors from the rear fanning strip 74 to the equipment field 60.

Accordingly, it will be seen that the access panel 48 may be securely and yet removably mounted in a substantially flat condition over the otherwise open side of the assembly by initially interfitting the projections and recesses 78, 80 thereof with the slots 72 of the hold-down strip 70. Thereafter, the assembled panel 48 and strip 70 may be placed in a substantially flat condition at the open side surface of the assembly 20, whereupon the opposite edge 86 of the panel 48 may be slideably inserted, substantially along its entire edge, in the channel 88 just described. Thereupon, the captivated fasteners 82 may be inserted as previously described into the threaded openings 83 provided therefor in the facing surface 64. The panel 48 is then held in a substantially flat and secure condition against the peripheral edge portions or surfaces 64 and 66. Advantageously both the panel 48 and rear fanning strip 74 may readily be removed (thus also moving aside the conductors received through the fanning strip 74) to allow access to the back plane wiring.

It will be noted that the frame member top and bottom wall portions 39 and 41 overlie the top and bottom edge portions of panel 48 to complete the enclosure, these latter walls 39 and 41 being of relatively rigid metallic material, thereby insuring the integrity of the enclosure thus formed. In this regard, it will also be noted that the module field block 24, test field block 26 and equipment field block 28, as well as access panel 48 and hold-down strip 70 are all preferably formed, as by molding, from a suitable non-conductive material and preferably a relatively rigid and moldable plastic material.

Referring now to FIGS. 4 through 6 inclusive, a novel grounding arrangement for the connector assembly of the invention will next be described. Initially referring to FIG. 5, it will be seen that each of the protector modules 25 carries, at a bottom portion thereof, a plurality of terminal members. A first pair of these terminals 98 are for receiving an incoming line pair, while a second pair 100 are for receiving a corresponding line pair from the inside equipment. The remaining terminal 102 is designated as the ground terminal, through which any over-voltage or current surge condition is to be discharged or dissipated. Accordingly, and referring to FIG. 4, the rear or back plane side of module field block 24 includes corresponding groups of five terminals each which are here designated by like reference numerals 98, 100, 102, together with the respective suffixes a, b and c.

Advantageously, a novel ground bus means or system is provided for electrically interconnecting all of these ground terminals which are located interiorly of the enclosure defined by the assembled connector assembly, 20, that is, in the back plane 54. In the illustrated embodiment, the novel ground bus system includes a first, generally centrally disposed bus member or bus bar 104 of a predetermined cross-section, preferably equivalent to No. 6 AWG solid wire size. This central conductor or ground bus 104 will be seen to run vertically and be generally centered with respect to the ground plane 54. The module field block 24 is preferably provided with a corresponding groove or slot 106 (see FIG. 6) to receive the first bus bar 104. This bus bar 104 is provided with a plurality of generally circular slots or openings 107 in its upper surface which in turn receive generally cylindrical bus bars or conductive rods 108.

These latter bus bars or conductive rods 108 are coupled directly to respective ground terminals 102a, 102b, etc., as by soldering as indicated, for example, generally at 110. These latter bus bars 108 are preferably No. 12 AWG solid conductors. It will be noted with reference to FIG. 3 that a total of ten protector modules 25 are arranged in each horizontal row. Accordingly, no more than five of these ground terminals 102a, etc., are coupled to any given bus bar 108 before its junction with the larger center bus member 104. In this regard, the bars 108 are further coupled with the slots 107 which are formed to receive them in the rectangular center bus 104 by suitable means as by soldering as indicated generally at 112.

Advantageously, the ground bus system is carried exteriorly of the housing for grounding with the frame 22, which it will be remembered is mounted to a main distribution frame, which comprises what is known in the art as a "frame ground". Alternatively, as will be seen presently, a novel ground selecting means or assembly of the invention permits the connector ground to be carried to some ground other than, or isolated from, this frame ground, or what is generally known in the art as an "isolated ground".

Referring again to FIGS. 4 and 6, an additional bus bar member 114 is provided for carrying this ground connection exteriorally of the housing or enclosure defined by the assembled connector assembly. This latter bus bar 114 is also preferably equivalent in cross-section to No. 6 AWG solid wire size. A groove or channel 115 is provided in the module field block 24 to receive this second bus bar 114. Advantageously, it is relatively simply interfitted with the similarly dimensioned center bus bar 104 by providing identical slots in each of the bus bars extending substantially half-way therethrough. These slots then readily interfit to interengage the two bus bars 104 and 114 in a substantially "T-shaped" configuration, this junction being indicated generally by reference numeral 116 in FIG. 4 and in FIG. 6. Additionally, this connection may be further secured as by soldering as also indicated at 118 in FIG. 4.

Referring now to FIGS. 7 through 10, inclusive, the details of the ground selecting means of the illustrated embodiment will now be described. Initially, it will be noted that the structure to be next described comprises adjustable ground selecting means for alternatively coupling the ground bus means just described to one of the frame ground and a selected second ground, isolated from the frame ground.

Referring initially to FIGS. 7 and 9, as previously noted, the rear portion of the frame member 22 substantially overlies the module field block rear wall portion 46. In this regard, the module field block and the frame member define a further pair of aligned through openings 120, 122 in these rear surfaces thereof, through which a portion 126 of the ground bus 114 projects so as to carry the circuit ground exteriorally of the back plane or interior of the housing or enclosure. The through opening 122 of the module field block includes a raised peripheral lip portion 124 for electrically insulating or isolating the ground bus 114 and projecting portion 126 thereof from the metal frame 22.

The means for selecting one of the frame ground and isolating ground comprises an electrically conductive link means or assembly coupled with the projecting portion 126 of the ground bus 114, which is provided with a through opening or aperture 127 for this purpose. This electrically conductive link means or structure is indicated in FIGS. 3 and 10 generally by reference numeral 130. This link means is selectively movable between a first position wherein it may be electrically coupled to the frame member 22 and a second position wherein it is out of electrical contact with the frame member 22 and free to receive alternate grounding means such as one or more wires or cables 131 for electrically coupling with a selected isolated grounding means.

Moreover, the adjustable ground selecting means or assembly of FIG. 9 will be seen to be located at the rear side of the connector assembly 20, for example, as viewed in FIG. 1, that is, the side at which the stub or cable 31 is received and the side which is mounted to the main distribution frame. Generally speaking, access may be had to this rear side even when the assembly is mounted to the main equipment frame, as the mounting means (not shown) generally includes some hinge-like structure for swinging the connector assembly 20 to one side to gain access to the rear side thereof. Accordingly, the ground connection may be changed from a frame ground to an isolated ground even in the field.

Referring now more particularly to the structure of the link means or assembly 130, it will be seen that it includes a first generally right-angle link 132 which includes first and second legs 132a and 132b. The first leg 132a has a through aperture 134 alignable with the through aperture 127 of the projecting ground bus portion 126 to be coupled thereto by suitable means such as a screw and nut type fastener designated generally 138. The module field block rear side wall 46 further includes an outwardly projecting, electrically non-conductive support member 140 formed integrally therewith for supporting the second leg 132b. In the illustrated embodiment, the support member 140 is provided with a generally U-shaped slot 142 alignable with a second through aperture 143 in the leg 132b of right-angle link 132 to receive a similar screw and nut type fastener 144.

The frame member 22 further includes an outwardly projecting electrically conductive grounding tab 146 integral therewith. This grounding tab 146 projects in generally side-by-side alignment with and is spaced apart from the projecting support member 140. The link means or assembly further includes a second substantially flat link member 150 which is of suitable length and selectively positionable for coupling the first link second leg 132b with the frame grounding tab 146. In the illustrated embodiment the flat link 150 and right-angle link 132 further include cooperating locking means for defining first and second positions of the link assembly as respectively illustrated in FIGS. 7 and 8. In the first position, illustrated in FIG. 7 (and in FIG. 10), the second link is positioned to complete the electrically conductive path between the first link second leg portion and the grounding tab. In the second position, illustrated in FIG. 8, the second link is positioned for projecting substantially oppositely outwardly from the support member 140 with respect to the location of grounding tab 146, to thereby receive alternate or isolated grounding means 131.

In the illustrated embodiment, this locking means comprises alignable through apertures in the first and second links for receiving the fastener assembly 144 therethrough. In this regard, an aperture 154 in the flat link 150 will be seen to be alignable with aperture 143 in first link 132 to receive the previously mentioned fastener assembly 144 therethrough as well. Additionally, a second through aperture 152 is provided in the second link which is spaced apart from the first aperture 154 and locatable in registry with a similar through aperture 147 in the grounding tab 146 to receive a similar screw and nut type fastener assembly 156 therethrough.

Moreover, in order to positively lock the flat link 150 in one or the other of the two positions illustrated respectively in FIGS. 7 and 8 additional locking means is provided. This additional locking means takes the form of an outwardly projecting locking tab 160 at an end portion of the right-angle link second leg 132b, and cooperating locking slots 162 and 164, which are generally rectangular in shape, formed in the flat link 150. In this regard, the first locking slot 162 is located intermediate the two fastener-receiving apertures 152 and 154, and this first slot 162 interlocks with the tab 160 when the link 150 is in the first position, as illustrated in FIG. 7 to achieve a frame ground.

The second locking slot 164 is formed in an end part of the link 150 and locks with the tab 160 when the link 150 is rotated by substantially 180 degrees to the second position, as illustrated in FIG. 8, to receive an isolated ground. In the isolated grounding position illustrated in FIG. 8, the screw and nut fastener 156 may be used to couple the wires or cables 131 or other suitable grounding means with the link 150 at through aperture 152 thereof.

Referring now to remaining FIGS. 12, 13 and 14, further novel features of the invention with respect to the assembly of the test field block 26 and equipment field block 28 with the frame 22 and module field block 24 will next be described.

As previously indicated with reference also to FIGS. 1 and 3, the test field block and equipment field block are mounted in a substantially side-by-side arrangement to generally define a front side of the connector assembly 20. This is done to promote ready access to the terminals of these two blocks for testing purposes and for connecting and disconnecting inside equipment respectively, when the connector assembly is mounted to the main distribution frame in the field. In this regard, it will be appreciated that a plurality of such connector assemblies may be mounted in vertical columns and horizontal rows on a given main distribution frame, whereby access for test purposes and equipment connection or disconnection purposes is most readily facilitated by arranging the test field block and equipment field block at the front side in this fashion. Many prior art arrangements have provided the test field block and equipment field block as a single, integrally molded member. However, in many instances it is desirable to provide a plurality of different terminal configurations for the external terminals or equipment field 60 of the field block 28. However, the test field block is generally provided as a single configuration to accept a complementary test shoe assembly.

Accordingly, the present invention advantageously provides an equipment field block 28 as a separate member, non-integral with the test field block 26. Moreover, the invention advantageously provides means for mounting the test field block and the equipment field block in such a way as to permit selective removal for repair or replacement of either thereof separately. At the same time, the mounting of these two blocks is such as to hold them in a side-by-side condition for together defining a front side of the connector assembly. This also permits equipment field blocks to be provided with a plurality of terminal or field configurations, without changing the exterior configuration thereof or the means provided for interfitting with the remainder of the connector assembly 20.

In the illustrated embodiment, the novel mounting means for the test field block and equipment field block include cooperating tongue and groove means on the abutting sides of the respective blocks for holding these abutting sides in alignment throughout a major fractional portion of their respective lengths. Referring to FIG. 3 and FIG. 14, it will be seen that abutting sides 26a and 28a of the test field block and equipment field block respectively are held in alignment by an outwardly projecting tongue or ridge 170 which interfits with a complementary configured groove, channel or slot 172 on the side 26a of the test field block. It will be noted that the ridge or tongue and the groove slot or channel each runs substantially the entire length of the side surface 26a or 28a of the respective block on which it is located.

As best seen in FIG. 14, the outer or opposite side 28b of the equipment field block 28 is held in place with respect to the frame 22 by a suitable fastener member or screw 174 which extends through an opening 173 in frame top wall 39 and into a threaded aperture 175 provided therefor in the facing surface of the block 28. A similar arrangement comprising a similar fastener or screw 174a and opening 173a is provided at the opposite or bottom wall 41 of the frame 22.

Referring to FIG. 11, the test field block is similarly coupled to an extension 39a of the top wall 39 of frame 22. In this regard, this extension 39a is provided with two downwardly depending tabs 176 which receive a top portion of the test field module flat thereagainst. To this end, the test field module top portion is provided with a pair of through apertures 178 for receiving suitable fasteners, for example, screws 180 therethrough to engage the tabs 176 which may be suitably internally threaded for this purpose. It will be appreciated that similar tabs 176a are located at a similar extension 41a of the bottom wall 41 of frame 22, which it will be remembered is substantially a mirror image of the top wall portion 39 thereof. Similar through apertures 178a and cooperating fasteners or screws 180a are provided at this bottom edge of test field block 26 as well.

In this regard, it is also noted that frame extensions 39a and 41a overlie edge portions of the module field block extensions or wall portions 38 and 40 to enclose the back plane 56 of the test field.

Also, a pair of small plates 181, 181a are mounted between the tabs 176, 176a and the test field block 26. These plates carry tapped bores 183, 183a, accessible through U-shaped slots 185, 185a in top and bottom edges of test field block 26 for receiving mating fasteners of the test shoe (not shown), which is used to test the lines as previously mentioned.

Referring now to FIG. 3 and FIGS. 11, 12 and 13, in accordance with a further feature of the invention, stablizing means are included for substantially preventing bowing out of the test field block relative to the adjacent edge 44 of the module field block.

It will be noted that the provision of the test field block and equipment field block as separate units results in a relatively elongate, narrow configuration of the test field block 26 as best viewed, for example, in FIG. 12. It will be remembered that the fasteners 178, 178a are utilized to mount the test field block to the frame member 22. Accordingly, the groove 172 which receives the complementary tongue portion 170 of the equipment field block serves to hold this side of test field block in substantially flat condition and in side-by-side alignment with the equipment field block. In this regard, these two blocks define and locate their respective fields in substantially parallel planes, which are relatively offset somewhat.

However, in view of the relatively great unsupported length of the test field block on the opposite side, that is, the side adjacent the wall portion 40 of module field block 24, there may be some tendency of the test field block to bow out somewhat at its medial portion. Accordingly, stablizing means in the form of a tab 186 on the test field block and a complementary slot 188 on the wall portion 40 of module field block 24 are provided. In this regard, the slot 188 will be seen to comprise an elongate, relatively narrow through opening in the wall 40, which is spaced from the edge 42. This edge 42 will be remembered to be adjacent to the test field block 26, and when assembled therewith abuts the overlying shoulder portion or edge 44 thereof. The tab 186 is substantially centrally located along the facing (with respect to wall 40) edge portion 187 of rear surface 184 of the test field block, located behind and spaced apart from the shoulder portion or edge 44. Hence, the spacing of slot 188 with respect to edge 42 corresponds to the spacing of tab 186, so that when the tab 186 is received therein, the shoulder 44 and edge 42 are held in abutting condition. The tab 186 is of complementary dimensions for interfitting with the slot 188.

Referring briefly to FIG. 13, some further details of the structure of the tab 186 are seen from a view of the rear or inside portion of the test field block 26. It will be noted that the rear or inner side of test field block 26, here designated generally by reference numeral 184, includes a plurality of generally cylindrical bosses, projections or "silos" 190. These slightly raised projections or silos are utilized to mount terminals, so as to insure substantial electrical isolation or insulation between terminals. In this regard, the projecting nature of these silos is intended to provide a longer electrical discharge path and increased electrical insulation resistance between the respective terminals carried therein. However, in order to form the tab 186, which is located substantially behind the plane of the back surface 184, a plurality of the silos 190 along the medial edge part are formed in a semi-circular configuration, rather than as cylinders. These semi-circular projections serve essentially the same function along the edge 187 of surface 184, but permit the formation of the tab 186 thereupon substantially continuous with and supported by the material of the outer edges of the semi-circular projections 192.

From the foregoing, it will be seen that the novel construction of the frame member and respective field blocks of the invention and the novel means for assembly thereof define a surprisingly compact connector assembly. In this regard, it will be recalled that downsizing and other space saving measures are continuing objectives in the design of such connector assemblies. In particular, it will be noted that the novel provision of top and bottom surface portions 39 and 41 of the frame member 22 and the extensions 39a and 41a thereof, for respectively mounting the test field block and equipment field block, form an assembled connector of minimum height, while still maintaining terminals for up to 100 line pairs on the respective fields. Additionally, the arrangement of the module field block to receive protector modules in a ten-by-ten generally rectangular array minimizes the side area of the connector assembly. Also, the above-described flat access panel 48 and mounting thereof including the provision and location of respective front and rear fanning strips 92 and 74, also minimize the side-to-side thickness of the assembled connector assembly.

What has been illustrated and described herein is a novel and improved telephone distribution frame connector assembly. While the invention has been illustrated and described herein with reference to a preferred embodiment, the invention is not limited thereto. Those skilled in the art may devise various alternatives, changes and modifications upon reading the foregoing description. The invention includes such alternatives, changes and modifications insofar as they fall within the spirit and scope of the appended claims.

The invention is claimed as follows:

1. A telephone distribution frame connector assembly for connecting incoming lines to inside equipment comprising: means for forming a module field, a test field and an equipment field; a frame member constructed of electrically conductive material for mounting said fields to a telephone distribution frame also of electrically conductive material and defining a frame ground; means for mounting said fields to said frame member to collectively define an enclosure having one open side; an access panel for normally covering said one open side; one or more of the fields including a plurality of ground terminals located interiorally of said enclosure; ground bus means for electrically interconnecting all of said ground terminals; and adjustable ground selection means for alternatively coupling said ground bus means to one of said frame ground any selected second ground, isolated from said frame ground.

2. An assembly according to claim 1 wherein said means forming said module field includes a module field block constructed of electrically non-conductive material, and wherein said module field block and said frame member define aligned through openings in predetermined surfaces thereof to receive a portion of said ground bus means projecting therethrough so as to carry circuit ground outwardly of said enclosure; the through opening of said module field block including a surrounding projecting lip portion for electrically isolating said ground bus means projecting portion from said frame member; and wherein said ground selection means includes electrically conductive link means coupled with said ground bus means projecting portion and selectively movable between a first position wherein said link means may be electrically coupled to said frame member and a second position wherein said link means is out of electrical contact with said frame member and free to receive means for electrically coupling with selected isolated grounding means.

3. An assembly according to claim 2 wherein said test field and said equipment field are mounted to said frame in side-by-side condition to define a front side of said enclosure and wherein said module field block includes a first portion having an edge coupled with one edge of said front side to define a left side of said enclosure generally perpendicular to said front side and further includes a wall portion integral with said first portion and generally perpendicular to said left side to thereby define a rear side of said enclosure generally spaced apart and parallel with said front side; said frame member including a portion overlying and substantially coextensive with said rear side; said through openings in said enclosure and said frame for receiving said bus bar therethrough being defined at said enclosure rear side; said ground selecting means being located adjacent an exterior surface of the frame member portion overlying said rear side.

4. An assembly according to claim 2 wherein said link means includes a first right-angle link having a first leg electrically coupled with said ground bus means projecting portion, and a second leg at substantially right angles to said first leg; said module field block further including an outwardly projecting, electrically non-conductive support member for supporting said second leg; said frame member including an outwardly projecting electrically conductive grounding tab in generally side-by-side alignment with and spaced apart from said support member; said link means further including a second, substantially flat link selectively positionable for coupling said first link second leg portion with said frame grounding tab; and cooperating locking means on said first and second links respectively for defining said first position, wherein the second link is positioned to complete an electrically conductive path between said first link second leg portion and said grounding tab and said second position wherein said second leg projects substantially oppositely outwardly from said support member with respect to the location of said grounding tab relative thereto.

5. An assembly according to claim 4 wherein said locking means comprises alignable first through apertures in said first and second links for receiving a fastener therethrough for coupling with said support member, a second through aperture in said second link spaced from said first through aperture therein and locatable in registry with said ground tab to receive fastening means for coupling therewith, an outwardly projecting locking tab on said first link, and cooperating first and second longitudinally spaced locking slots on said second link for respectively alternatively mating with said locking tab when said second link is in said first and second positions respectively.

6. An assembly according to claim 2 wherein said plurality of ground terminals comprise selected terminals of said module field; and wherein said ground bus means comprises a plurality of first parallel, spaced apart bus bars, each being electrically coupled with no more than five of said ground terminals, a second bus bar of substantially greater cross-sectional area than said plurality of first bus bars and arranged first bus bars to(said second bus bar; and a third bus bar of substantially similar cross-sectional area to said second bus bar and disposed at right angles thereto; and means for electrically coupling said third bus bar with said second bus bar; said third bus bar including said portion of said ground bus means projecting outwardly of said enclosure.

7. An assembly according to claim 6 wherein said means coupling said first bus bar to said second bus bar comprises a plurality of slots at spaced apart locations in said second bus bar of complementary dimension for receiving respective ones of said first bus bars therein.

8. An assembly according to claim 7 wherein said means for coupling said second bus bar to said third bus bar comprises a pair of similar, complementary and interfitting slots in each of said second and third bus bars, each for receiving substantially one-half of a cross-section of the other of said second and third bus bars therein.

9. A telephone distribution frame connector assembly for connecting incoming lines to inside equipment comprising: a module field block, a test field block and an equipment field block; a frame member for mounting said field blocks on a telephone distribution frame; said field blocks when mounted to said frame member collectively defining said connector assembly; said test field block and said equipment field block together defining a front side of the assembly; and first means for mounting said test field block and said equipment field block to said frame member and second means for mounting said test field block to said module field block such that said test field block and said equipment field block are in side-by-side alignment and so as to permit selective removal for repair or replacement of either thereof separately, said first mounting means including cooperating tongue and groove means on abutting sides of said equipment field block and said test field block, respectively, for holding said abutting sides thereof in alignment throughout substantially the entire respective lengths thereof, said assembly further including stabilizing means for substantially preventing bowing out of said test field block relative to an edge of said module field block located adjacent thereto and on a side thereof opposite the side abutting said equipment field block, said module field block including a rear wall portion defining a rear side of said connector assembly generally spaced apart and parallel with said front side; said frame member including a rear portion overlying said rear side; and cooperating aligning means on said frame member rear portion and said rear side for holding the frame member and module field block substantially in a predetermined alignment.

10. An assembly according to claim 3 wherein said aligning means comprises a plurality of alignable through openings in said module field block rear side and said overlying portion of said frame member, respectively; said through openings in said module field block rear wall being surrounded by raised peripheral lips for engaging said frame member through openings and thereby aligning the respective through openings for receiving a plurality of conductors therethrough.

11. A telephone distribution frame connector assembly for connecting incoming lines to inside equipment comprising: a module field block, a test field block and an equipment field block; a frame member for mounting said field blocks on a telephone distribution frame; said field blocks when mounted to said frame member collectively defining said connector assembly; said test field block and said equipment field block together defining a front side of the assembly; and first means for mounting said test field block and said equipment field block to said frame member and second means for mounting said test field block to said module field block such that said test field block and said equipment field block are in side-by-side alignment and so as to permit selective removal for repair or replacement of either thereof separately, said first mounting means including cooperating tongue and groove means on abutting sides of said equipment test field block and said test field block, respectively, for holding said abutting sides thereof in alignment throughout substantially the entire respective lengths thereof, said test field block having tab means projecting from a side thereof opposite the side abutting said equipment field block, said module field block having complementary slot means for receiving said tab means, said tab means and said slot means forming when said tab means is inserted in said slot means an interlocking means for rigidly retaining said test field block relative to an edge of said module field block located adjacent thereto.

12. An assembly according to claim 11 wherein said tab and slot means comprises an elongate slot located substantially centrally along a wall of said module field block which defines said adjacent edge and an outwardly protruding tab located substantially centrally along a facing edge portion of said test field block, said tab being complementary dimensions for interfitting with said elongate slot.

13. An assembly according to claim 12 wherein said test field block includes an outwardly projecting shoulder portion overlying substantially the entire length of said module field block edge, said outwardly projecting tab being formed in said facing edge portion below said outwardly projecting shoulder and spaced apart therefrom; and said complementary slot being located in said module field block wall spaced inwardly a corresponding amount from said module field block edge.

14. An assembly according to claim 11 wherein said module field block includes a rear wall portion defining a rear side of said connector assembly generally spaced apart and parallel with said front side; said frame member including a rear portion overlying said rear side; and cooperating aligning means on said frame member rear portion and said rear side for holding the frame member and module field block substantially in a predetermined alignment.

15. An assembly according to claim 14 wherein said aligning means comprises a plurality of alignable through openings in said module field block rear side of said overlying portion of said frame member, respectively; said through openings in said module field block rear wall being surrounded by raised peripheral lips for engaging said frame member through openings and thereby aligning the respective through openings for receiving a plurality of conductors therethrough.

* * * * *